US006817549B2

(12) United States Patent
Dankert

(10) Patent No.: US 6,817,549 B2
(45) Date of Patent: Nov. 16, 2004

(54) VALVE NEEDLE, IN PARTICULAR FOR A SPRAYCOATING LIQUID

(75) Inventor: Manfred Dankert, Rödermark (DE)

(73) Assignee: ITW Oberflachentechnik GmbH & Co. KG (DE)

( * ) Notice: Subject to any disclaimer, the term of this patent is extended or adjusted under 35 U.S.C. 154(b) by 36 days.

(21) Appl. No.: 10/277,113

(22) Filed: Oct. 22, 2002

(65) Prior Publication Data

US 2003/0080219 A1 May 1, 2003

(30) Foreign Application Priority Data

Oct. 27, 2001 (DE) .......................................... 101 53 142

(51) Int. Cl.[7] .............................. B05B 1/30; B05B 1/32; F16K 31/02
(52) U.S. Cl. ...................... 239/583; 239/539; 239/541; 239/585.5; 251/903
(58) Field of Search ................................ 239/583, 539, 239/541, 585.5, 585.4, 533.9, 533.11; 137/903; 217/903

(56) References Cited

U.S. PATENT DOCUMENTS

| 1,690,893 A | * | 11/1928 | Dorner ........................ 239/453 |
| 1,792,929 A | * | 2/1931 | Remey .......................... 516/4 |
| 1,886,159 A | * | 11/1932 | Brown ........................ 251/155 |
| 1,901,979 A | * | 3/1933 | Meusy ........................ 137/382 |
| 2,670,239 A | * | 2/1954 | Ditch .......................... 239/415 |
| 3,451,626 A | * | 6/1969 | Roosa ..................... 239/533.11 |
| 3,844,487 A | * | 10/1974 | Malec ........................ 239/526 |
| 4,853,160 A | * | 8/1989 | Wood ........................ 261/41.5 |
| 5,178,366 A | | 1/1993 | Kojima et al. |
| 5,375,994 A | | 12/1994 | Friderich et al. |
| 5,409,165 A | | 4/1995 | Carroll, III |
| 5,667,194 A | * | 9/1997 | Barron ................... 251/129.01 |
| 6,135,360 A | * | 10/2000 | Ren et al. ..................... 239/136 |
| 6,260,775 B1 | * | 7/2001 | Lambert et al. ......... 239/533.3 |
| 6,494,389 B1 | * | 12/2002 | Reiter ....................... 239/585.1 |

FOREIGN PATENT DOCUMENTS

| DD | DD 86 530 | 12/1971 |
| DE | 3245571 | 6/1984 |
| DE | 196 50 781 A1 | 6/1998 |
| DE | 196 54 514 A1 | 7/1998 |
| DE | 19809599 | 10/1998 |
| EP | 0 248 230 | 7/1991 |
| JP | 05060261 | 3/1993 |
| JP | 06193745 | 7/1994 |
| WO | WO 00/34702 | 6/2000 |

* cited by examiner

*Primary Examiner*—William C. Doerrler
(74) *Attorney, Agent, or Firm*—Lowe Hauptman Gilman & Berner, LLP

(57) ABSTRACT

A valve needle (2), in particular for spraycoating apparatus and their spraycoating devices. The valve needle (2) has a shank (4) and a plunger (8) affixed thereon. The shank (4) is made of another material than is the plunger (8). A preferred material for the shank (4) is an industrial ceramic.

28 Claims, 2 Drawing Sheets

US 6,817,549 B2

VALVE NEEDLE, IN PARTICULAR FOR A SPRAYCOATING LIQUID

FIELD OF THE INVENTION

The invention relates to a valve needle, in particular to a valve needle used for a spray coating liquid. The invention also relates to valves, apparatus and devices containing at least one valve needle, each for a particular spraycoating liquid.

BACKGROUND OF THE INVENTION

The German patent documents DE 196 50 781 A1 and DE 196 54 514 A1 show spraycoating apparatus fitted with a valve needle. This valve needle is displaced by compressed gas, preferably compressed air, in one longitudinal direction, and by the force of a compressed spring in the opposite longitudinal direction, so as to act on the plunger of the valve needle. The plunger and the valve needle are integral. High grade steel is used in practice for said integral part. The valve needle wears on account of the liquid rubbing against it and by the friction at the valve-aperture edge.

SUMMARY OF THE INVENTION

The object of the present invention is a valve needle comprising an integral shank fitted with a front shank segment constituting the needle tip.

The objective of the present invention is also to extend the service life of the valve needle. Moreover the manufacturing costs shall not be higher than, but rather lower than in the state of the art with respect expenditures for material and processing. Moreover the valve-needle material shall be compatible with the various coating liquids. However the valve needle material also shall be compatible with the valve-seat material, the valve needle in a valve cooperating with the valve seat material. The valve-needle material may not degrade the valve seat material and the service life.

This objective is by the valve needle of the invention which contains an integral shank comprising a front shank-end segment constituting the needle tip, characterized in that a plunger is affixed to the shank, this shank being made of a different material than the piston.

The invention also relates to using such a valve needle and spraycoating apparatus, control units, manifolds and spraycoating devices containing such a valve needle.

The invention offers the following particular advantages: long valve-needle service life due to lesser abrasion of its shank by the coating liquid, in particular at the needle tip; more economical valve-needle manufacturing costs in particular due to the elimination of the constraint that the valve-needle shank must be machined out of a solid material exhibiting the plunger diameter, because the diameter of the plunger used to generate a pneumatic or hydraulic axial valve-needle drive pressure requires a substantially larger diameter than that of the valve-needle shank; the lowered valve-needle manufacturing costs make it more economical to use exchangeable valve needles made of different materials for different spraycoating apparatus and other spraycoating devices in order that there be no chemical reactions between them and the coating liquid; the plunger may be made of a material of lower specific weight than of the needle shank and more economical than said shank's material, and more easily processed than said shank material.

BRIEF DESCRIPTION OF THE DRAWINGS

The invention is elucidated below in relation to illustrative embodiments and to the attached drawings.

DEFINITIONS

"Apparatus" denotes in particular "coating-liquid spraycoating apparatus" that may be manual or automatic liquid spraycoating guns. They are also designated as "spray guns". "Apparatus" moreover designates manifold apparatus and liquid changeover apparatus containing one or more such valve needles, for use with arbitrary liquids, but in particular for coating liquids. This term also includes paint switching valves allowing feeding alternatively different coating liquids, preferably including liquid or gaseous line cleaning fluids. "Devices" denotes hydraulic circuits and installations containing at least one such valve and/or one such apparatus with at least one valve needle, each in particular for coating liquid.

DETAILED DESCRIPTION OF THE INVENTION

Figure 1:
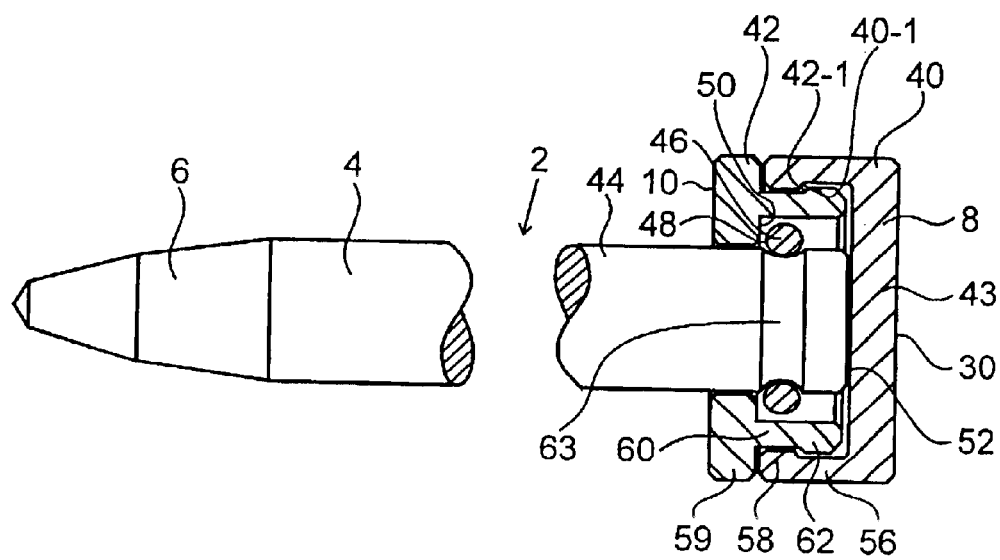
FIG. 1 is a sideview, partly in axial. section, of a valve needle of the present invention.

The valve needle 2 of FIG. 1 contains an integral shank 4 comprising a front shank segment 6 designed as a valve tip. The valve needle may be "blunt". Seen in sideview, said segment may be smooth or it may be stepped once or more.

Moreover the valve needle 2 contains a plunger 8 affixed to the shank 4 and made of a material different from that of the shank.

Preferably the shank 4 is made of a more abrasion-resistant material than is the plunger 8. At the same time or alternatively, care must be taken that the shank 4 shall consist of a material compatible with the coating liquid, in particular one which shall not chemically react with said liquid In the preferred embodiment of the present invention, the shank is seamlessly integral and consists of one of the following materials: an industrial ceramic, in particular a silicate ceramic, an oxide ceramic, a non-oxide ceramic, the latter in particular in the form of carbides or nitrides, zirconium silicate, mixtures of two or more of the said materials. Such materials are included of which the surface is more abrasion-resistant than is high-grade steel. The ceramic material may contain additives, for instance binders, anti-seize means, colorants. The shank is a solid.

When the shank 4 and the plunger 8 are made jointly from an integral material in the manner of the state of the art, their manufacture shall be very expensive. In that procedure not only will the ceramic be very costly, but also the reduction by grinding a blank from the diameter of the plunger 8 to the substantially smaller diameter of the shank 4. The diameter of the plunger 8 is substantially larger than that of the shank 4 in the region of said plunger. For that reason the plunger 8 is fitted with a forward-pointing end face 10 annularly enclosing the shank 4 and exhibiting an adequately large cross-section to be able—when loaded at comparatively small pressure applied to it by a compressed fluid, in particular a compressed liquid or preferably a compressed gas—to generate a large axial force whereby the valve needle 2 may be forced against a comparatively hard compression spring 12 (FIG. 2) rearward from a valve seat 14 to open a valve aperture 16.

In the invention, the shank 4 and the plunger 8 are separate parts affixed to each other.

Figure 2:
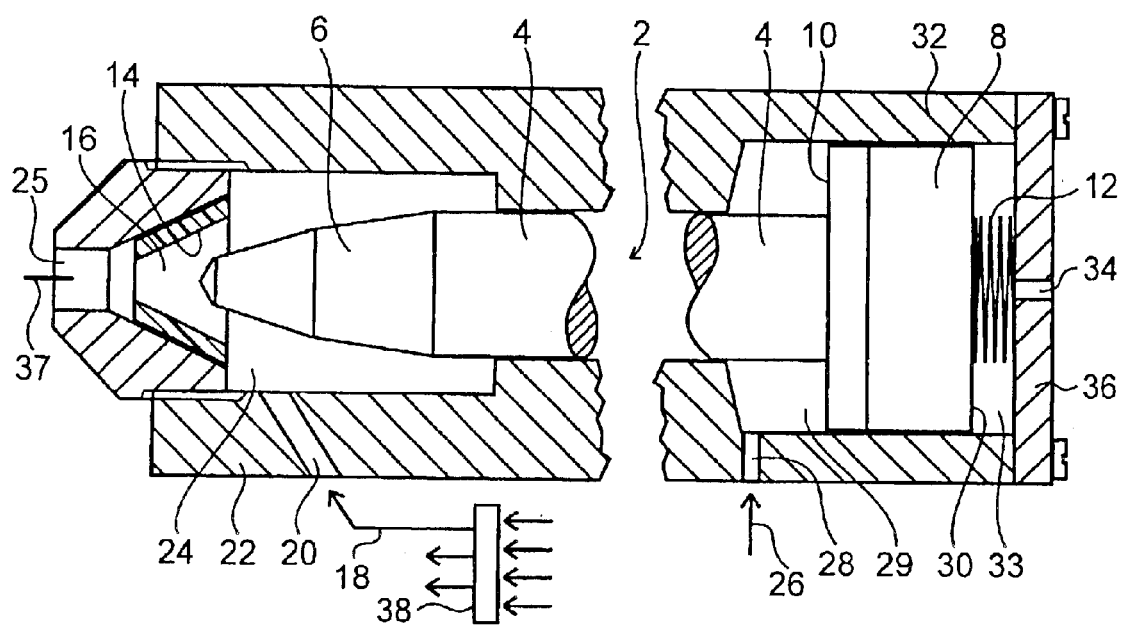
FIG. 2 is a schematic axial section of a spraycoating apparatus for coating liquid, the valve needle of FIG. 1 being shown in sideview.

When the valve aperture 16 is open as in FIG. 2, coating liquid 18 may flow from a housing aperture 20 of the housing 22 of a spraycoating apparatus into a valve chamber 24, passing from latter at the tapered end segment 6 of the shank 4 through the valve aperture 16 and then being sprayed through a valve aperture 25 onto an omitted object. The valve seat 14 may be fitted with a coating or a resilient ring to reduce or preclude wear of the front end segment 6 of the shank 4 against the valve seat, and to assure tight valve closing by supporting the shank 4 on the valve seat 14 in sealing manner when the valve shall be closed.

The compressed fluid 26, compressed liquid or preferably compressed air or another compressed gas moves through another housing aperture 28 through a further housing aperture 28 to the front end face 10 of the plunger 8 and around the shank 4.

Fluid pressure also may be applied to the rearward-pointing end face 30 of the plunger 8 for the purpose of closing the valve. However, as regards the preferred embodiment shown in FIG. 2, the valve-closing pressure shall be generated by the compression spring 12 which forces the valve needle 2 (shank 4 with plunger 8) axially forward onto the valve seat 14.

The valve needle 2 (shank 4, plunger 8) is axially guided within the housing 22. The plunger 8 is axially guided within a cylinder 32 constituted by the housing 22. The housing 22 may be integral or may consist of several parts. At the front end face 10 of the plunger 8, the cylindrical space constitutes a pressurized-fluid chamber 29 for a compressed fluid and at the rear end face 30 of the plunger 8 it constitutes a chamber zone 33 which preferably shall be vented, for instance by a vent aperture 34, said zone 33 containing the compression spring 12 which is axially prestressed between the rear end face 30 of the plunger 8 and a rear end face 36 of the housing 22.

The spraycoating apparatus may contain one or several high-voltage electrodes 37 electrostatically charging the coating material.

Together, the valve needle 2 and the valve seat 14 constitute a valve. Such valves may be configured not only in a spraycoating device shown in FIG. 2, but also in a spreader or a liquid-changing device, for instance a paint changer 38. Such devices may contain several such valves implementing alternative feeds of different coating liquids or of cleaning fluids (liquids or gases) into the valve chamber 24.

Preferably the plunger is made of high-grade steel, brass or plastic. Other materials also are applicable. Such materials all should allow easy sliding inside the cylinder 32.

As shown in detail in FIG. 1, the plunger 8 is not integral, but instead in two parts. It contains a cap-shaped or cup-shaped integral rear plunger part 40 and an annular, integral front plunger part 42 affixed to said part 40. The rear plunger part 40 constitutes a plunger base 43.

The rear end segment 44 of the shank 4 extends through the annular front plunger part 42. The rear end segment 44 of the shank 4 is fitted with an annular projection 46 enclosing it and projecting radially from it and as a result exhibits in the projecting zone a forward-pointing stop surface 48 which is axially opposite a rearward-pointing stop surface 50 of the front plunger part 42 and in this manner precludes the said front plunger part 42, and hence the entire plunger 8, from slipping to the rear on the shank 4.

The plunger base 43 is situated opposite, and rests on, a rearward-pointing end face 52 of the shank 4 and as a result prevents the plunger 8 from sliding forward on the shank 4.

Because the plunger base 43 seals the cross-section of the plunger 8, no pressurized fluid (for instance compressed air) may pass from the fluid pressurized chamber 29 into the rear chamber zone 33.

A number of ways are available to affix the annular front plunger part 42 to the rear plunger part 40 for the purpose of keeping them axially together, for instance by means of matching threads, bonding, welding or detent means.

A detent connection is the preferred embodiment. This connection can assume the form shown in FIG. 1. The annular front plunger part 42 and the rear plunger part 40 of FIG. 1 are axially nesting parts. The annular front plunger part 42 is fitted with at least one forward-pointing detent surface 42-1 and the rear plunger part 40 is fitted with at least one matching rearward-pointing detent surface 40-1, said two detent surfaces automatically snapping radially into place in each other at a predetermined depth of engagement of the two parts 40 and 42 due to the radial stresses in the material of said two parts 40 and 42. The two detent surfaces 40-1 and 42-1 preferably extend radially and exhibit identical diametrical zones whereby the two parts 40 and 42 may be engaged solely by radially expanding the radially outer part and/or by radial compression of the radially inner part of the two parts 40 and 42.

In the embodiment shown in FIG. 1, the rear plunger part 40 is fitted with a hollow-cylindrical plunger case 56 extending in the forward direction from the plunger base 43 and fitted with an illustratively annular beak 58 of which the axially rear end constitutes the rearward-pointing detent surface 40-1 of the rear plunger part 40 which is situated axially away from the plunger base 43. The front plunger part 42 integrally comprises a disk-shaped front segment 59 and a hub-like, short tubular segment 60 axially running to the rear and telescoping into the plunger case 56 and illustratively fitted with an annular, radially outwardly running beak 62 that constitutes the forward-pointing detent surface 42-1 of the front plunger part 42.

The radially inward running annular beak 58 of the rear plunger part 40 exhibits an inside diameter only slightly smaller, for instance by several tenths of a mm, than the outside diameter of the annular, radially outward running beak 62 of the front plunger part 42. In order that the two beaks 58 and 62 may slide axially over each other and then may radially snap into position one beyond the other, the plunger case 56 must be resiliently expansible and/or the hub segment 60 must be resiliently compressible when subjected to an axial force compressing the two parts 40 and 42. Alternatively the plunger case 56 may be radially expanded by heating in order that it may be plugged onto the hub segment 60. To facilitate such plugging engagement, the axially external peripheral rims of the beaks 58 and 62 shall advantageously be beveled.

The annular protrusion 46 of the shank 4 may consist of a collar integral with said shank. This collar need project radially only little beyond the rear shank segment 44 because it need only keep the plunger 8 in place axially. Therefore its radial projection may be substantially smaller than the radial projection of the plunger 8 beyond the shank 4. As a result the radial projection of the plunger 8 at its front end face 10 must be larger to allow a low fluid pressure to generate a large axial force on the plunger 8 and hence also on the shank 4. When the shank 4 and its annular protrusion 46 are integral, a blank with an outside diameter of the annular protrusion 46 need be ground off only very little, for instance a few tenths of a mm so that it shall constitute the shank 4 with its slightly lesser diameter than that of the protrusion 46.

However, in a preferred embodiment of the present invention, a circumferential groove 63 of shallow depth is constituted in the rear end face 44 of the shank 4, illustratively being only a few tenths of a mm deep, which receives a locking ring 46 acting as the annular protrusion 46.

Figure 3:
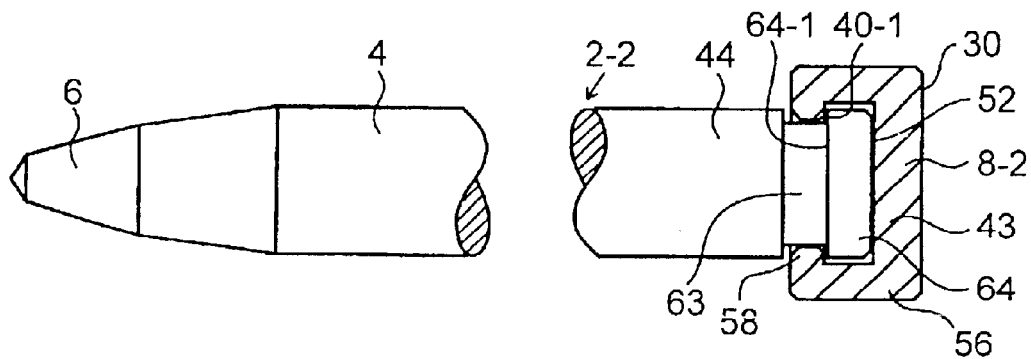
FIG. 3 is a further embodiment of a valve needle of the present invention in sideview and partly in axial section.

FIG. 3 shows a valve needle 2—2 comprising a shank 4 made of one of the above cited materials and fitted with a circumferential groove 63 in the rear shank segment 44, a seamlessly integral plunger 8-2 being affixed to said shank. A piston case 56 runs axially forward from a plunger base 43 of this plunger 8-2 beyond the rear end segment 64 of the shank 4 situated behind the circumferential groove 63. At its front end, the plunger case is fitted with an annular, inward-projecting beak 58 comprising the rearward-pointing detent surface 40-1 of FIG. 1. However the beak 58 does not engage a second plunger part, but instead the circumferential groove 63 of the shank 4. The collar-shaped rear end segment 64 of the shank 4 comprises a forward-pointing detent surface 64-1 situated in the circumferential groove 63 at which the rearward-pointing detent surface 40-1 of the plunger case 56 will snap-in radially when the plunger case 56 is made to telescope beyond the rear end segment 64 of the shank 4. In the radially unstressed state, the inside diameter of the beak 58 of the plunger case 56 is smaller than the outside diameter of the rear shank part 64. The plunger base 43 rests against the rearward-pointing end face 52 of the shank 4 and limits the depth of engagement between the plunger 8-2 and the shank 4. The front inner circumferential rim of the plunger 8-2 and the rear external circumferential rim of the shank 4 preferably shall be beveled to allow easily slipping the plunger 8-2 onto the rear end segment 64 and axially forcing it away to snap the beak 58 into the circumferential groove 63. The plunger case 56 is resilient to allow it to expand axially when it is mounted on the shank 4 and to radially snap into the circumferential groove 63 when it reaches said groove.

Figure 4:
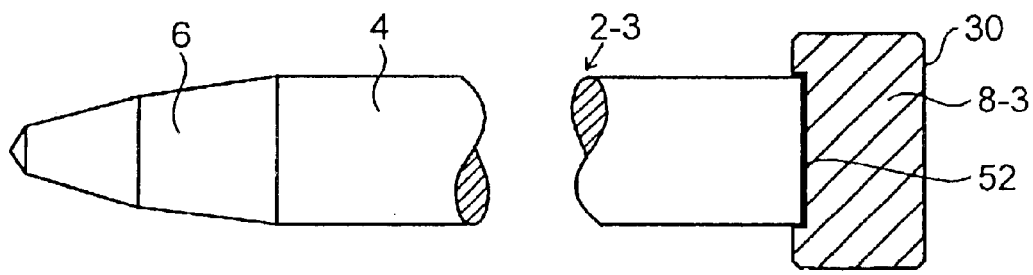
FIG. 4 is a further embodiment of a valve needle of the invention in sideview and partly in axial section.

The valve needle 2-3 shown in FIG. 4 comprises a seamlessly integral plunger 8-3 "frictionally" welded to the rearward-pointing end face 52 of a seamlessly integral shank 4. To weld the two components 4 and 8-3 to each other, they are axially compressed while simultaneously being relatively rotated about their axial center axis. Heat of friction is generated thereby between them. Upon reaching a predetermined frictional temperature, the axial force is increased while the relative rotation of the two components 4 and 8-3 is reduced to zero, said two components then welding together. In this manner a permanent weld connection is produced between the ceramic shank 4 and the plunger 8-3 illustratively made of high-grade steel or another material. This welding procedure offers the advantage that only little time is required for it and that no additional welding material is required.

Figure 5:
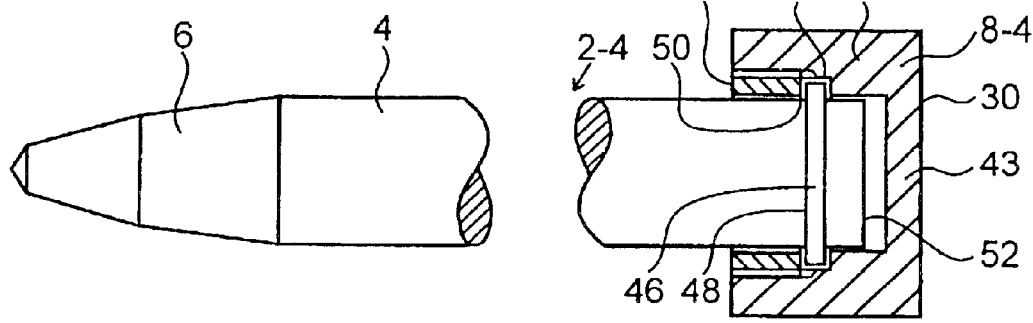
FIG. 5 is a still further embodiment of a valve needle of the invention in sideview and partly in axial section.

FIG. 5 shows a valve-needle 2-4 wherein a two-part plunger 8-4 consists of a cup-shaped rear plunger part 40-4 and an annular front plunger part 42-4 screwed into said part 40-4. The two parts subtend an inner circumferential groove 70 engaged by a locking ring 46 (or a collar) of the shank 4 to position the plunger 8-4 in both axial directions. In another design however the plunger base 43 again might rest against the rear end face 52 of the shank 4 and limit the axial excursion by the plunger on the shank 4. In the latter case the two plunger parts 40-4 and 42-4 need not subtend an inner circumferential groove 70, instead it would suffice that the annular front plunger part 42-4 constitute a rearward-pointing rest surface 50 as a stop at the locking ring 46 of the shank 4 to prevent the plunger 8-4 from being pulled rearward off the shank 4.

What is claimed is:
1. A valve needle, comprising:
   a locking ring;
   a shank having a front shank end segment constituting a tip of the valve needle; and
   a plunger affixed to the shank;
   wherein
   the shank is made of another material than the plunger;
   said shank is a solid body integrally made of ceramic;
   the plunger includes a rear plunger part defining a plunger base and an annular front plunger part affixed to said rear plunger part;
   said shank includes a circumferential groove and extends through said front plunger part; and
   said locking ring is partially received in said groove and a portion of said locking ring which is not received in said groove defines an annular protrusion enclosing said shank and projecting outwardly from said shank, said annular protrusion having a forward-pointing stop surface which is axially situated opposite a rearward-pointing stop surface of the front plunger part to thereby prevent the annular front plunger part from slipping rearward on the shank.

2. The valve needle as claimed in claim 1, wherein said ceramic is more abrasion-resistant than the material of the plunger.

3. The valve needle as claimed in claim 1, wherein said ceramic is selected from the group consisting of silicate ceramics, oxide ceramics, non-oxide ceramics, and mixtures thereof.

4. The valve needle as claimed in claim 1, wherein the plunger or at least an external surface thereof is made of a material selected from the group consisting of high-grade steel, brass, plastic.

5. A valve needle, comprising:
   an integral shank having a front shank end segment constituting a tip of the valve needle; and
   a plunger affixed to the shank;
   wherein
   the shank is made of another material than the plunger; and
   the plunger includes an integral rear plunger part having a plunger base and an integral, annular front plunger part affixed to said rear plunger part, the shank extending through said front plunger part;
   said valve needle further comprising an annular protrusion enclosing said shank and projecting outwardly from said shank, said annular protrusion having a forward-pointing stop surface which is axially situated opposite a rearward-pointing stop surface of the front plunger part to thereby prevent the annular front plunger part from slipping rearward on the shank.

6. The valve needle as claimed in claim 5, wherein the plunger base is situated axially opposite a rearward-pointing end face of the shank.

7. The valve needle as claimed in claim 5, wherein the rear plunger part further comprises a hollow, cylindrical plunger base which extends forward from the plunger base and which is affixed to the annular front plunger part.

8. The valve needle as claimed in claim 5, wherein
   the front plunger part and the rear plunger part are axially nesting in each other; and
   the front plunger part comprises at least one forward-pointing detent surface and the rear plunger part comprises at least one rearward-pointing detent surface, said detent surfaces being radially engaged over a predetermined nesting depth of the front and rear plunger parts by radially stressing the material of both said front and rear plunger parts, the detent surfaces exhibiting identical diameter zones.

9. The valve needle as claimed in claim 5, wherein the annular protrusion includes a locking ring engaging in a circumferential groove of the shank.

10. The valve needle as claimed in claim 5, wherein the shank and said annular protrusion are one integral component.

11. A valve needle, comprising:
an integral shank having a front shank end segment constituting a tip of the valve needle; and
a plunger affixed to the shank;
wherein
the shank is made of another material than the plunger;
the plunger is mounted on a rear end of the shank and comprises a rearward-pointing detent surface which radially engages a circumferential groove of the shank and which is situated axially in front of a forward-pointing detent surface of the shank; and
said shank is a solid body integrally made of ceramic.

12. A spray-coating device containing at least one valve in at least one path of a coating liquid, wherein said at least one valve includes a control element which is a valve needle as defined in claim 1.

13. Application of a valve needle as defined in claim 1 as a control element of a valve for a coating liquid in one selected from the group consisting of spray-coating apparatus for coating liquids, paint-changing apparatus for several different coating liquids, supply conduits for coating liquids in a spray-coating device.

14. The valve needle as claimed in claim 6, wherein the plunger base is mounted on the end face of the shank in order to preclude the plunger from slipping forward on the shank.

15. The valve needle as claimed in claim 3, wherein said non-oxide ceramics are selected from the group consisting of carbides or nitrides, zirconium silicates, and mixtures thereof.

16. A valve needle, comprising:
a shank having a front shank end segment constituting a tip of the valve needle; and
a plunger affixed to the shank;
wherein
the shank is made of another material than the plunger;
said shank is a solid body integrally made of ceramic; and
said shank is substantially constant in cross section in the vicinity of where the plunger is affixed to the shank, except for a groove or projection having a radial extension of a few tenths of mm.

17. A valve for spraying coating equipment, said valve comprising a valve needle comprising:
a shank having a front shank end segment constituting a tip of the valve needle; and
a plunger affixed to the shank;
wherein
the shank is made of a material different than that of the plunger; and
the plunger includes a rear plunger part and an annular front plunger part attached to said rear plunger by snap connection, said shank extending through said front plunger part.

18. The valve as claimed in claim 17, wherein said shank has an integral, radial projection defining a shoulder on which a rear end face of said front plunger part rests.

19. A valve for spraying coating equipment, said valve comprising a valve needle comprising:
a shank having a front shank end segment constituting a tip of the valve needle; and
a plunger affixed to the shank;
wherein
the shank is made of a material different than that of the plunger;
said valve is pneumatically controlled; and
the plunger includes a rear plunger part and an annular front plunger part attached to said rear plunger by one of snap connection and thread connection, said shank extending through said front plunger part.
said valve further comprising a connection ring disposed between said plunger and said shank;
wherein said shank has a circumferential groove in which said connection ring is received, said ring defining a radial surface on which a rear end face of said front plunger part rests.

20. A valve for spraying coating equipment, said valve comprising a valve needle comprising:
a shank having a front shank end segment constituting a tip of the valve needle; and
a plunger affixed to the shank;
wherein
the shank is made of a material different than that of the plunger;
said valve is pneumatically controlled; and
said plunger is an integral body of a general U shape in cross section, said plunger having a circumferential locking portion extending radially inwardly from a free end of said U shape, said shank having a matching circumferential groove engaging and receiving said locking portion.

21. The valve as claimed in claim 17, wherein said shank is a solid body integrally made of ceramic.

22. The valve as claimed in claim 17, further comprising:
a front chamber having a valve opening closable by said tip of the valve needle;
a rear chamber in which said plunger is completely received; and
a neck portion connecting said from and rear chambers, said shank extending from the rear chamber into the front chamber through said neck portion.

23. The valve as claimed in claim 22, wherein said rear chamber has, in front of said plunger, a fluid inlet for introducing a pressurized fluid into said rear chamber to drive said valve needle rearward thereby opening said valve opening.

24. The valve as claimed in claim 23, wherein said plunger is slidable, in a sealing manner, on an inner wall of the rear chamber.

25. The valve as claimed in claim 24, wherein said front chamber has another fluid inlet for introducing a coating liquid into the front chamber to said valve opening.

26. The valve as claimed in claim 24, further comprising an electrode in the vicinity of said valve opening.

27. The valve needle as claimed in claim 5, wherein said shank is a solid body integrally made of ceramic.

28. The valve as claimed in claim 18, wherein said shank rests on a forward pointing surface of said rear plunger part.

* * * * *